United States Patent [19]

Crawford

[11] Patent Number: 4,905,148
[45] Date of Patent: Feb. 27, 1990

[54] THREE-DIMENSIONAL SURFACE REPRESENTATION USING CONNECTIVITY METHOD WITHOUT LEAKS

[75] Inventor: Carl R. Crawford, Milwaukee, Wis.

[73] Assignee: General Electric Company, Milwaukee, Wis.

[21] Appl. No.: 228,404

[22] Filed: Aug. 4, 1988

[51] Int. Cl.[4] .............................................. G06F 15/62
[52] U.S. Cl. .................................. 364/413.1; 382/16; 378/901
[58] Field of Search .................... 364/413.13; 382/26, 382/27, 16; 378/901

[56] References Cited

U.S. PATENT DOCUMENTS 4,751,643  6/1988  Lorensen et al. ................... 364/414

OTHER PUBLICATIONS

H. E. Cline et al., "3D Reconstruction of the Brain from Magnetic Resonance Images Using a Connectivity Algorithm", from *Magnetic Resonance Imaging*, vol. 5, pp. 345–352, 1987.

*Primary Examiner*—Clark A. Jablon
*Attorney, Agent, or Firm*—James O. Skarsten; Douglas E. Stoner

[57] ABSTRACT

Objects within a three-dimensional tomographic data set which occupy the same portion of the image histogram are separated prior to three-dimensional surface extraction by applying connectivity first to unwanted objects. The unwanted objects thus identified are modified so that they no longer occupy the same portion of the histogram or are flagged. Next, connectivity is applied to the desired objects using a criterion different from the one used on the unwanted objects.

7 Claims, 3 Drawing Sheets

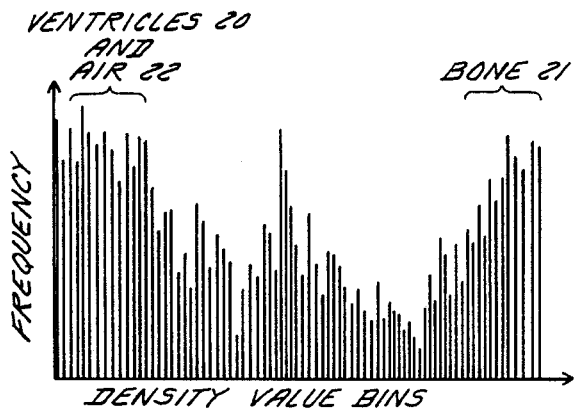
FIG. 5
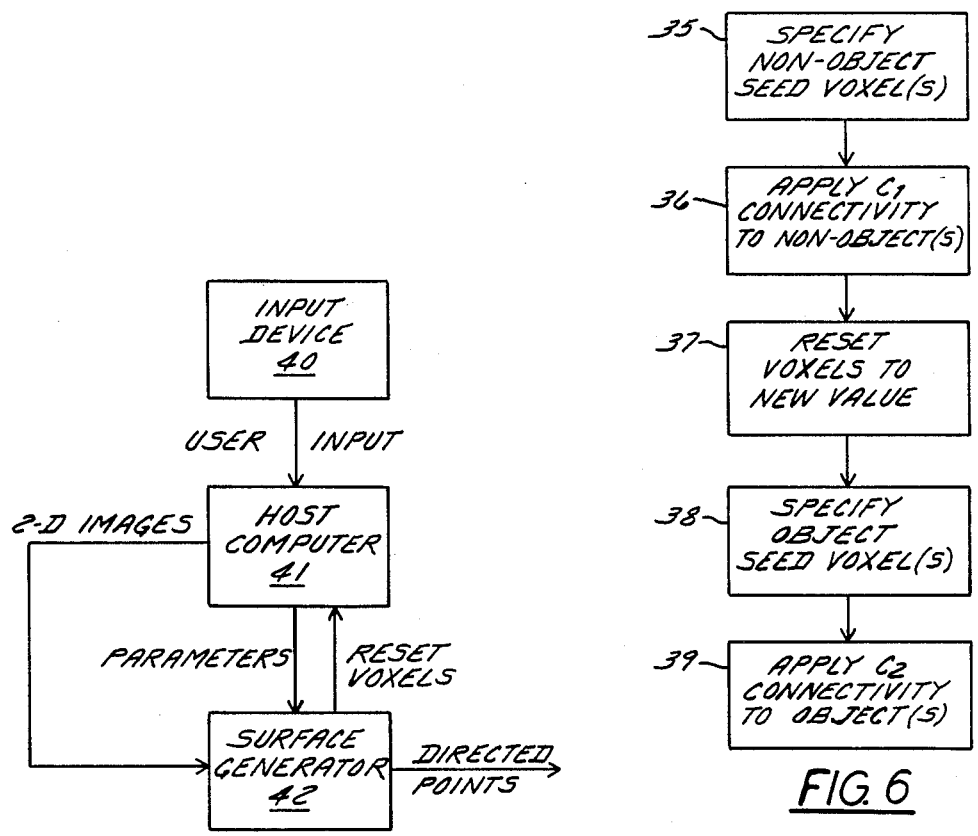
FIG. 6
FIG. 8

THREE-DIMENSIONAL SURFACE REPRESENTATION USING CONNECTIVITY METHOD WITHOUT LEAKS

This application is related to U.S. application Ser. No. 228,891 entitled "Three-Dimensional Object Removal Via Connectivity," filed concurrently with this application.

BACKGROUND OF THE INVENTION

The present invention relates in general to three-dimensional (3-D) display of tomographic data, and more specifically to preventing leaks from an object of interest into other unwanted objects during extraction of the object using a connectivity method.

Tomographic medical imaging employs the collection of data representing cross sections of a body. A plurality of object interrogations can be processed mathematically to produce representations of contiguous cross-sectional images. Such cross-sectional images are of great value to the medical diagnostician in a non-invasive investigation of internal body structure. Techniques employed to collect the data are, for example, x-ray computed tomography (CT), nuclear magnetic resonance imaging (MR), single photon emission tomography, positron emission tomography, or ultrasound tomography.

A body to be imaged exists in three dimensions. Tomographic devices process data for presentation as a series of contiguous cross-sectional slices along selectable axes through the body. Each cross-sectional slice is made up of a number of rows and columns of voxels (parallelepiped volumes with certain faces corresponding to pixel spacing within each slice and others corresponding to slice spacing), each represented by a digitally stored number related to a computed signal intensity in the voxel. In practice, an array of, for example, 64 slices may each contain 512 by 512 voxels. In normal use, a diagnostician reviews images of a number of individual slices to derive the desired information. In cases where information about a surface within the body is desired, the diagnostician relies on inferences of the 3-D nature of the object derived from interrogating the cross-sectional slices. At times, it is difficult or impossible to attain the required inference from reviewing contiguous slices. In such cases, a synthesized 3-D image is desired.

Synthesizing a 3-D image from tomographic data is a two-step process. In the first step, a mathematical description of the desired object is extracted from the tomographic data. In the second step, the image is synthesized from the mathematical description.

Dealing with the second step first, assuming that a surface description can be synthesized from knowledge of the slices, the key is to go from the surface to the 3-D image. The mathematical description of the object is made up of the union of a large number of surface elements (SURFELS). The SURFELS are operated on by conventional computer graphics software, having its genesis in computer-aided design and computer-aided manufacturing, to apply surface shading to objects to aid in image interpretation through a synthesized two-dimensional image. The computer graphics software projects the SURFELS onto a rasterized image and determines which pixels of the rasterized image are turned on, and with what intensity or color. Generally, the shading is lightest (i.e., most intense) for image elements having surface normals along an operator-selected line of sight and successively darker for those elements inclined to the line of sight. Image elements having surface normals inclined more than 90 degrees from the selected line of sight are hidden in a 3-D object and are suppressed from the display. Foreground objects on the line of sight hide background objects. The shading gives a realistic illusion of three dimensions.

Returning now to the first step of extracting a mathematical description of the desired surface from the tomographic slice data, this step is broken down into two substeps, namely the extraction (i.e., identification) of the object from the rest of the tomographic data, and the fitting of a surface to the extracted object. A surface is fitted to the object by giving a mathematical description to the boundary between the voxels of the object and any non-object voxels. The description can be obtained using the marching cubes, dividing cubes, or cuberille methods, for example. The dividing cubes method is described in U.S. Pat. No. 4,719,585, issued to Cline et al. on Jan. 12, 1988, which is incorporated by reference.

In the dividing cubes method, the surface of interest is represented by the union of a large number of directed points. The directed points are obtained by considering in turn each set of eight cubically adjacent voxels in the data base of contiguous slices. Gradient values are calculated for the cube vertices using difference equations. Each large cube formed in this manner is tested to determine whether the object boundary passes through it. One way to perform this test is to compare the density (i.e., intensity value) at each vertex with a threshold value (or a range between two threshold values) defining the object. If some densities are greater and some less than the threshold (or some within the range and some not), then the surface passes through the large cube. This process will be referred to as thresholding whether using a single threshold or a range (e.g., upper and lower thresholds).

In the event that the surface passes through the large cube, then the cube is subdivided to form a number of smaller cubes, referred to as subcubes or subvoxels. By interpolation of the adjacent point densities and gradient values, densities are calculated for the subcube vertices and a gradient is calculated for the center of the subcube. The densities are tested (e.g., compared to the threshold). If the surface passes through a subcube, then the location of the subcube is output with its normalized gradient, as a directed point. The union of all directed points generated by testing all subcubes within large cubes through which the surface passes, provides the surface representation. The directed points are then rendered (i.e., rasterized) for display on a CRT, for example.

In general, the thresholding method works very well when the voxels corresponding to an object-of-interest are substantially the only ones in the tomographic data that fall within the particular thresholding range (i.e., are the only occupants of the particular neighborhood in the image histogram). This is true of bone in CT and blood vessels in MR, for example. However, many potential objects-of-interest within a body share a density range (or other identifying property), such as various organs in CT measurements. Thresholding alone cannot distinguish between such objects in the same range or having the same property.

A method known as connectivity can be used to separate objects that occupy the same neighborhood in a histogram. In using connectivity, only voxels connected to a user-identified seed voxel in the object-of-interest will be considered during the surface extraction step. A voxel is connected to the seed if and only if (1) the voxel is a neighbor of the seed or a neighbor of another connected voxel, and (2) the voxel shares a specified property (e.g., falling within the same threshold range) with the seed voxel. Connectivity has been successfully used in generating 3-D CT images of soft tissue structures such as the knee ligaments.

A particular problem encountered with the connectivity method is the possibility of leaks. Consider, for example, the application of connectivity to a tomographic set of 2-D images in which two objects need to be separated which are in close proximity. Because of system imperfections such as finite bandwidth, partial volume, field inhomogeneities and additive noise, a small bridge might exist between the two objects making it possible that the connectivity algorithm might leak from one object to the other and cause the two objects to be considered as one.

Several methods have been proposed to prevent leaks. One method is to have a user manually identify bridges before the connectivity algorithm is applied. This method is tedious and difficult to apply for inter-slice bridges. Another method is to circumscribe the object-of-interest with a user-defined bounding volume like a rectangular parallelepiped. This method does not work well for irregularly shaped objects (e.g., most internal organs). Another method operates by redefining the criteria for being connected. Thus, by specifying that a certain number of voxels have to overlap before they are considered to be neighbors, certain types of leaks can be plugged.

None of the prior-art methods are satisfactory for wide-spread application to medical images because each either fails in certain circumstances or is difficult and inconvenient to implement. The prior-art methods can be combined empirically to plug leaks in a wider class of cases. However, there still exist cases where the methods fail individually or collectively.

Accordingly, it is a principal object of the present invention to provide a method and apparatus for preventing leaks when applying connectivity to identify an object-of-interest in tomographic image data.

It is another object of the invention to construct a three-dimensional image of an object-of-interest from two-dimensional tomographic data using connectivity without leaks to unwanted objects.

It is a further object of the invention to provide method and apparatus to prevent leaks during application of connectivity to tomographic data with minimal reliance on user input.

SUMMARY OF THE INVENTION

These and other objects are achieved according to a method for generating a three-dimensional surface definition of an object-of-interest within a three-dimensional tomographic data set including a plurality of voxel data points. Each voxel has a respective density value and the object-of-interest includes voxels having density values satisfying a predetermined property. The term "density value" is used here in its broad sense of any characteristic being measured of an object, such as x-ray attenuation, nuclear spin relaxation, or ultrasound backscatter coefficient, for example. The method comprises the steps of (1) identifying a non-object seed voxel in the data set not in the object and having a density value which satisfies the property, (2) applying connectivity to the non-object seed voxel according to a first criterion $C_1$, (3) modifying the density value of each voxel satisfying connectivity according to $C_1$, (4) identifying an object-of-interest seed voxel, and (5) applying connectivity to the object seed voxel according to a second criterion $C_2$, where $C_1$ is not equal to $C_2$. Thus, leaks are prevented from the object during surface extraction using connectivity.

In another aspect of the invention, apparatus is provided having seed means to specify object and non-object seed voxels. Connectivity means is coupled to the seed means for applying connectivity to the non-object seed voxel according to the first criterion $C_1$ and subsequently applying connectivity to the object seed voxel according to the second criterion $C_2$. Modifying means is coupled to the connectivity means for changing, prior to application of criterion $C_2$, the value of each voxel satisfying connectivity according to $C_1$ to a value not satisfying the predetermined property.

The predetermined property can be any characteristic which defines a collection of voxels within the data set.

BRIEF DESCRIPTION OF THE DRAWINGS

The novel features of the invention are set forth with particularity in the appended claims. The invention itself, however, both as to its organization and method of operation, together with further objects and advantages thereof, may best be understood by reference to the following description taken in conjunction with the accompanying drawings in which:

FIG. 5 is a histogram corresponding to the tomographic data set of FIGS. 2-4.

FIG. 6 is a flow chart of a preferred method according to the invention.

FIG. 8 is a block diagram of a preferred apparatus according to the invention.

DETAILED DESCRIPTION OF THE INVENTION

Figure 1:
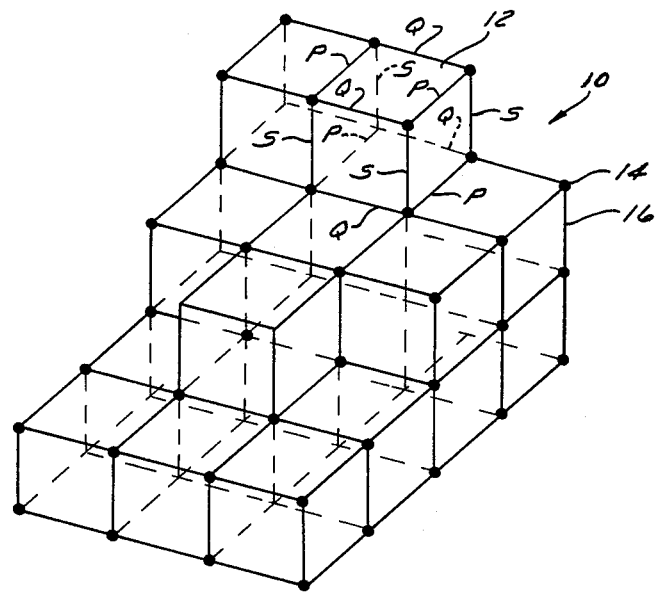
FIG. 1 represents a portion of an array of tomographic data from which a surface is to be extracted.

Referring to FIG. 1, there is shown, generally at 10, a part of a tomographic data set including an array of cubes defined by nodes 14 connected by edges 16. Each node 14 represents a signal amplitude of a voxel of tomographic data and each edge 16 represents the distance from one voxel to its neighbor. Although the volumes described are referred to as cubes, edges 16 are not necessarily all of equal length and are probably not since slice thickness is usually not equal to pixel resolution within the slice. Pixel spacings P and Q and slice spacing S are shown for cube 12.

Figures 2, 3, 4:
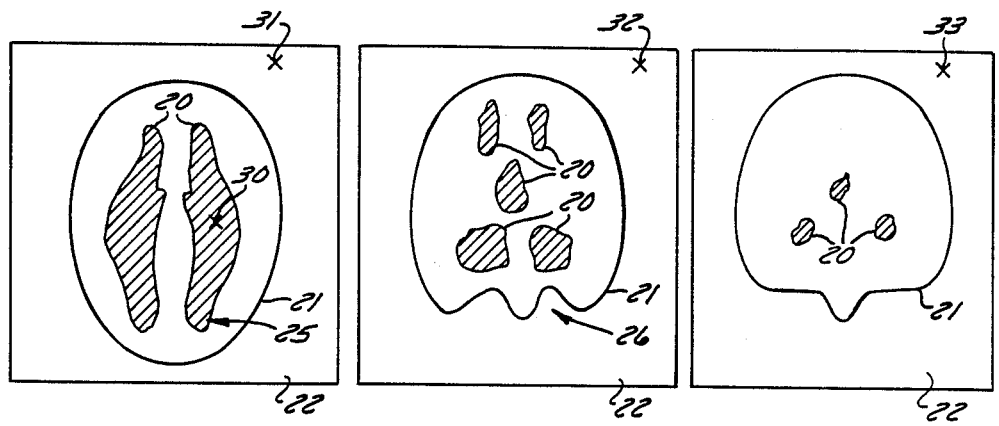
FIGS. 2, 3, and 4 are two-dimensional tomographic slices showing cranial ventricles which are exaggerated to show a leaking problem and its solution according to the invention.

A tomographic imaging system typically acquires data in the form of two-dimensional slices. FIGS. 2-4 represent slice images obtained by x-ray computed tomography (CT) of a head. The images are simplified by showing only cranial ventricles 20, bone 21, and air 22. By exaggerating slice thickness and slice spacing, the images will be considered to be adjacent slices in order to more clearly illustrate the problem of leaking during application of connectivity.

In the present example, it is desired to construct a 3-D image of cranial ventricles 20. FIGS. 2-4 are transverse sections approximately at the level of the forehead, eyes, and upper nose, respectively. Referring to FIG. 5, an image histogram of the slices plots density values versus frequency (i.e., number of voxels having each particular density value) in a plurality of bins. The use of thresholding to extract bone from the data works well because bone 21 is substantially the only constituent of the bins at the upper end of the histogram. However, thresholding will not work for cranial ventricles since ventricles 20 and air 22 share the lower end of the histogram. Therefore, connectivity must be used to separate the ventricles from the air.

Prior-art connectivity methods will fail to separate ventricles 20 and air 22 because of a leak from ventricles 20 into air 22 in the form of an inter-slice bridge near the orbits (i.e., eye sockets). Thus, although on each two-dimensional slice the ventricles and air are unconnected, because of the need for a finite number of slices there exists a bridge in the third dimension between the ventricles at 25 and the air at 26. The bridge causes connectivity of the ventricles to leak into the air. Having once leaked into air, the three-dimensional connectivity of the ventricles grows to include the air in all of the slices. The ventricles are then obscured in the final 3-D image by the air.

A general method according to the invention for preventing leaks is summarized in FIG. 6. The method modifies the voxel values of each object to which undesired bridges might occur. The term "modify" is used herein to indicate either that the voxel value is actually changed or that a flag or a mark is altered or appended to the value. If a flag is used, then a flag test will be incorporated into the neighbor criterion in subsequent steps.

Voxel modification is accomplished by applying connectivity to the unwanted objects. Any voxel identified in this step of connectivity is given a modified value that will not satisfy the connectivity criterion when connectivity is applied to the object-of-interest. A further aspect of the method is that the criteria for connectivity of the unwanted (non-object) voxels and the object voxels are different.

Referring now to FIG. 6, one or more non-object seed voxels are specified (e.g., by a user) in step 35. In step 36, connectivity is applied to the non-object(s) according to a first connectivity criterion $C_1$ which can be user-specified. In step 37, all voxels marked as connected during step 36 are reset to a new value so that they no longer share the histogram neighborhood with the object-of-interest. One or more object seed voxels are specified in step 38. In step 39, connectivity is applied to the object(s) according to a second connectivity criterion $C_2$, different from first criterion $C_1$.

The connectivity criteria preferably each take the form of a range (e.g., density values or other property) and a definition of potential neighbors to be checked for satisfying the range. The invention is particularly advantageous in the example of FIGS. 2-4 where the leaks occur along one particular dimension. $C_1$ can then be specified as a criterion not involving that particular dimension so that the non-object can be removed without leakage. Then $C_2$ can be specified as a three-dimensional criterion. This allows growth of ventricle 20 from a single object seed voxel 30 (FIG. 2) which is easily specified by the user. Although $C_1$ is two-dimensional and requires a non-object seed voxel 31, 32, and 33 (FIGS. 2-4) in the air of each slice, this is easily accomplished by the user in a single operation since there is a single corresponding position in each slice which contains air 22.

A further example of the invention will be described with reference to FIG. 7 which shows a femur bone 50 and the femoral head 51 received in the acetabulum 52 (hip socket). Since head 51 and acetabulum 52 occupy the same neighborhood of the image histogram, connectivity is required in order to extract a surface definition of acetabulum 52. However, prior-art connectivity methods will fail due to interslice bridges between head 51 and acetabulum 52.

According to the invention, a non-object seed voxel 53 is specified at the uppermost point in head 51. Since no voxel in acetabulum 52 is below any voxel in head 51 or femur 50, a three-dimensional criterion $C_1$ can be specified anisotropically by excluding neighbor voxels in the up direction (i.e., potential connected neighbors are in the same slice as or in the slice below a particular voxel). Thus, connectivity will grow from seed 53 to include head 51 but will not bridge or leak into acetabulum 52 since connectivity cannot go up. The femur and femoral head voxels identified by $C_1$ are set to a value outside of the range for bone. To eliminate all femoral voxels, a seed is then specified anywhere in acetabulum 52 and three-dimensional connectivity applied to that seed.

Figure 7:
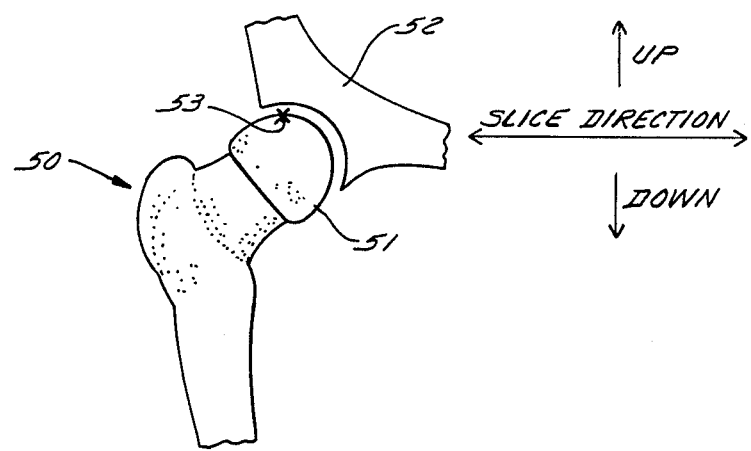
FIG. 7 is an anatomical diagram showing a further example of the invention.

In the embodiment of FIG. 7, it may sometimes be desirable to rotate the tomographic data set in order to favorably position the object and non-object. A preferred apparatus of the present invention is shown in FIG. 5, which is an improvement of apparatus shown in co-pending application Ser. No. 125,426, filed Nov. 25, 1987, now U.S. Pat. No. 4,868,748 which is hereby incorporated by reference in its entirety. A host computer 41 receives image data from a data acquisition system (not shown). Two-dimensional tomographic images are supplied to a surface generator 42 from computer 41. An input device 40, such as a keyboard, trackball, or mouse, supplies user input including seed voxel locations and criterion definitions to computer 41. Parameters such as seed voxel and criterion specifications, interpolation factors for performing the dividing cubes method, and other 3-D image specifications, are provided from computer 41 to surface generator 42. Both connectivity and surface extraction are preferably performed in surface generator 42. The locations of voxels determined to be reset during connectivity of the unwanted objects are provided from generator 42 to computer 41. After surface extraction, a plurality of directed points are provided from generator 42 to image rendering apparatus (not shown).

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed is:

1. A method for generating a three-dimensional surface definition of an object-of-interest within a three-dimensional tomographic data set, said data set including a plurality of voxel data points, each voxel having a respective density value, said object-of-interest including voxels having density values satisfying a predetermined property, said method comprising the steps of:

identifying a non-object seed voxel in said data set not in said object-of-interest and having a density value satisfying said property;

applying connectivity to said non-object seed voxel according to a first criterion $C_1$;

modifying the density value of each voxel satisfying connectivity according to $C_1$;

specifying an object-of-interest seed voxel; and applying connectivity to said object-of-interest seed voxel according to a second criterion $C_2$, where $C_1$ is not equal to $C_2$.

2. The method of claim 1 wherein $C_1$ defines a neighbor of a voxel differently than $C_2$.

3. The method of claim 2 wherein $C_1$ is anisotropic and wherein $C_2$ defines a three-dimensional connectivity.

4. The method of claim 2 wherein $C_1$ defines a two-dimensional connectivity and wherein $C_2$ defines a three-dimensional connectivity.

5. The method of claim 1 wherein said predetermined property is a range of density values.

6. Apparatus for generating a three-dimensional surface definition of an object-of-interest within a three-dimensional tomographic data set, said data set including a plurality of voxel data points, each voxel having a respective density value, said object-of-interest including voxels having density values satisfying a predetermined property, said apparatus comprising:

seed means for specifying an object seed voxel in said object-of-interest and a non-object seed voxel outside said object-of-interest and having said predetermined property;

connectivity means coupled to said seed means for applying connectivity to said non-object seed voxel according to a first criterion $C_1$, and for subsequently applying connectivity to said object seed voxel according to a second criterion $C_2$; and modifying means coupled to said connectivity means for changing, prior to application of criterion $C_2$, the value of each voxel satisfying connectivity according to $C_1$ to a value not satisfying said predetermined property.

7. The apparatus of claim 6 wherein said predetermined property is a range of density values and wherein said apparatus further comprises range means for specifying said range.

* * * * *